US006387511B1

(12) United States Patent
Hrdina et al.

(10) Patent No.: US 6,387,511 B1
(45) Date of Patent: May 14, 2002

(54) LIGHT WEIGHT POROUS STRUCTURE

(75) Inventors: Kenneth E. Hrdina, Horseheads; Daniel R. Sempolinski, Painted Post; Michael H. Wasilewski, Corning; C. Charles Yu, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/626,630

(22) Filed: Jul. 27, 2000

(51) Int. Cl.$^7$ .............................................. B32B 17/06
(52) U.S. Cl. ..................... 428/426; 428/704; 428/912.2
(58) Field of Search .............................. 428/426, 428, 428/704, 912.2, 312.6; 65/17.3, 22, 66

(56) References Cited

U.S. PATENT DOCUMENTS

| | | | |
|---|---|---|---|
| 3,923,484 A | 12/1975 | Randall | 65/18 |
| 4,363,647 A | * 12/1982 | Bachman et al. | 65/18.2 |
| 4,940,675 A | * 7/1990 | Bohlayer et al. | 501/12 |
| 5,154,744 A | 10/1992 | Blackwell et al. | 65/3.12 |
| 5,228,243 A | 7/1993 | Noll et al. | 51/216 |
| 5,698,484 A | 12/1997 | Maxon et al. | 501/54 |
| 5,922,100 A | 7/1999 | Cain et al. | 65/531 |
| 5,925,451 A | * 7/1999 | Ohya et al. | 428/307.3 |
| 6,012,304 A | * 1/2000 | Loxley et al. | 501/12 |

FOREIGN PATENT DOCUMENTS

WO  99/15468  4/1999  ........... C03B/19/00

* cited by examiner

Primary Examiner—Deborah Jones
Assistant Examiner—Gwendolyn A. Blackwell-Rudasill
(74) Attorney, Agent, or Firm—Patrick Pacella; Timothy M. Schaeberle

(57) ABSTRACT

These glass bodies are light weight porous structures such as a boules of high purity fused silica or ultra-low expansion glass. More specifically, the porous structures are supports for mirror blanks. Porous glass is made utilizing flame deposition of pure silica or doped silica in a manner similar to the production of high purity fused silica. Bubbles or seeds are formed in the glass during laydown. Several means of creating and controlling these seeds are available. The processes use incomplete combustion to create the bubbles. There are a number of different steps to create the incomplete combustion. One such step is a short distance between the hydrolysis flame and the glass precursor.

13 Claims, 2 Drawing Sheets

FIG. 1 Porous HPFS Glass
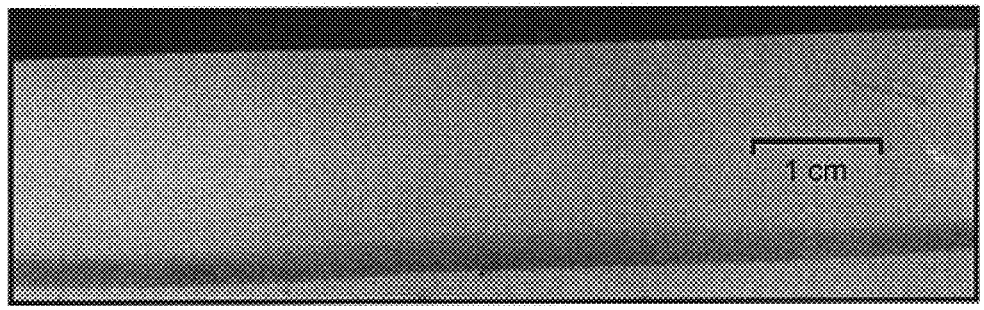
FIG. 2
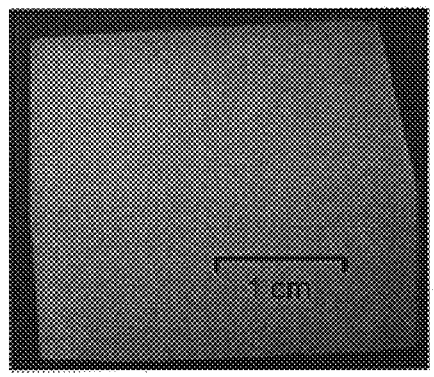

Spherical Pores

LIGHT WEIGHT POROUS STRUCTURE

TECHNICAL FIELD

This invention relates to light weight porous structures for glass bodies such as a boule of high purity fused silica such as HPFS® fused silica glass or ULE® ultra low expansion glass of Corning Incorporated, Corning, N.Y. 14830. More specifically, the porous structures are supports for high purity fused silica mirror blanks.

BACKGROUND OF THE INVENTION

Reducing the weight of mirror supports is vital for two applications. First, they are vital for the space program which has stringent weight constraints. Second, large scale terrestrial bound mirrors (over a meter in size) also desire light weight supports in order to have better control over the maneuverability of the mirrors while in use. The mirror supports should not add any stresses to the actual mirror. One of the best ways of doing this is to make the mirror support out of the same material as the mirrors so that no stresses from thermal expansion mismatch develop. Currently, mirrors are made of either high purity fused silica such as HPFS® fused silica glass or ULE® ultra low expansion glass of Corning Incorporated, Corning, N.Y. 14830. An additional requirement is that the mirror material must also be environmentally stable.

The existing method for making supports first involves making dense glass. Secondly, the glass is machined into an intricate honeycomb-like pattern to remove most excess weight. Thirdly, the mirror is bonded to the fabricated honeycomb structure. A process for making porous glass without first making dense glass would be highly desirable.

BRIEF SUMMARY OF THE INVENTION

The processes in this invention describe methods, using flame hydrolysis and incomplete combustion for making porous light weight glass which can be used for mirror supports. The composition of the glass can be controlled. Even though high purity fused silica and ultra-low expansion compositions were the focus of the invention, the method is not restricted to these compositions. The process in this invention allows for the fabrication of controlled layered structures such that pore free glass can be made directly on top of the porous structure. The thickness of the layers and number of the layers are controlled in this process.

The existing manufacturing method of supports first involves making dense glass. Secondly, the glass is machined into honeycomb-like pattern to remove most excess weight. Thirdly, the mirror is bonded to the fabricated honeycomb structure. This invention describes a method of making structural supports for mirrors out of porous glass. The porous glass may still require machining, but machining of porous glass will be much less expensive than the standard dense glass. Bonding to the mirror blank should not change for the porous glass since thin layers of dense glass can be manufactured onto the porous glass.

Porous glass is made utilizing flame deposition of pure silica or doped silica in a manner similar to the production of high purity fused silica. Bubbles or seeds are formed in the glass during laydown. Several means of creating and controlling these seeds are available. Two approaches are demonstrated. The first approach involves the use of a liquid feed burner in which organic precursors such as liquid octamethyl cyclo tetra siloxane (OMCTS) or OMCTS and titanium IV tetra isopropoxide (tipox) droplets are injected into the cavity. Results suggest that unreacted OMCTS impacting the boule creates bubbles (seeds). The second approach for creating porous structures involves the use of conventional vapor fed burners. Both of these processes use incomplete combustion to create bubbles. A number of different approaches can be used to create bubbles.

BRIEF DESCRIPTION OF THE DRAWINGS

FIG. 1 shows a porous glass made with liquid feed burners.

FIG. 2 shows a porous cube machined out of the glass.

DETAILED DESCRIPTION OF THE INVENTION

Figure 3:
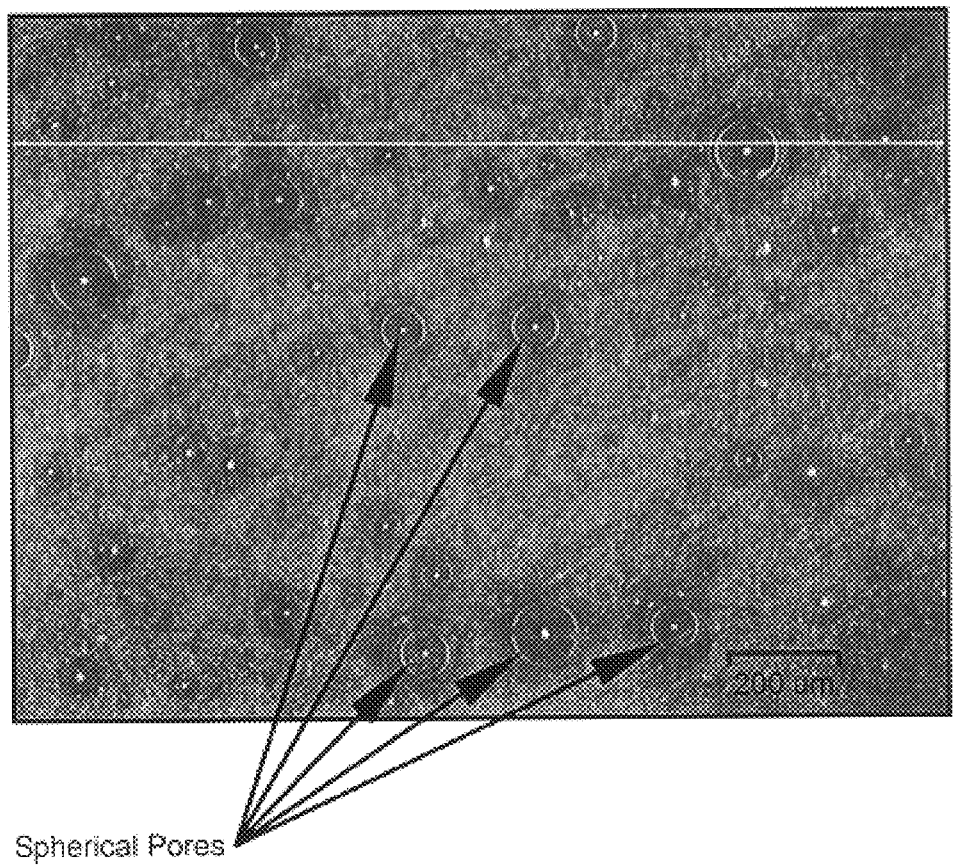
FIG. 3 shows an optical micrograph of the porous surface showing spherical pores.

High purity fused silica is customarily produced by a chemical vapor deposition process. In this process, oxide precursors, usually metal chlorides or organic silica precursor in vapor form, are introduced through a burner flame to produce molten oxide particles. These molten particles are deposited on a large support member to build up a body termed a boule.

In practicing the invention, a gas stream provides the vapors of at least one material that will hydrolyze to form an oxide in the flame of a combustion burner. The vaporizable material may be any of the metal halides, metal organics, or other compounds that are suitable for the conventional flame hydrolysis process of glass production. The material may be volatilized in conventional manner, for example by heating or entrainment by a carrier gas. Alternative procedures include generating vapors from a heated fluidized bed.

The glass precursors of this invention may vary widely. Relatively pure metal oxides are produced by thermal decomposition of precursors and deposition of the resulting oxides. The precursor may take the form of a vapor, or may be carried by a vapor. It may be decomposed by either flame hydrolysis or pyrolysis.

One such process is production of fused silica by hydrolysis or pyrolysis of a silica precursor. Commercially, this is an application of flame hydrolysis involving forming and depositing particles of fused silica which melt to form large bodies (boules). Such boules may be used individually, may be finished and integrated together into large optical bodies, or may be cut into small pieces for finishing as lenses and the like. In this procedure, the precursor is hydrolyzed and the hydrolyzed vapor is passed into a flame to form particles of a fused silica. The particles are continuously deposited, for example, in the cup of a refractory furnace where they melt to form a solid boule.

Besides essentially pure fused silica, this invention uses a fused silica doped with 5–11% by weight titania ($TiO_2$). Originally, chlorides of silicon and titanium were employed as precursors. Recently, primarily for environmental reasons, chloride-free precursors have been proposed. Specifically, a siloxane, octamethylcyclotetrasiloxane (OMCTS), and a titanium alkoxide, titanium isopropoxide, $Ti(OPri)_4$, are commercially employed.

The precursors are separately converted to vapor form and carried to a mixing manifold by a carrier gas, such as nitrogen. The mixture passes, via fume lines, into a flame where the precursors are converted into $SiO_2$—$TiO_2$ particles. These particles are collected in a refractory where they melt to form a solid boule.

The titania compounds may be selected from the group consisting of titanium isopropoxide, $Ti(OC_3H_7)_4$, titanium ethoxide, $Ti(OC_2H_5)_4$, titanium 2-ethylhexyloxide, $Ti[OCH_2(C_2H_5CHCH_4H_9]_4$, titanium cyclopentyloxide, $Ti(OC_3H_9)_4$, and the titanium amides, $(Ti(NR_2)_4$, or a combination thereof.

A prior art furnace produces the fused silica glass. Silicon-containing gas molecules are reacted in a flame to form $SiO_2$ soot particles. These particles are deposited on the hot surface of a body where they consolidate into a very viscous fluid which is later cooled to the glassy (solid) state. In the art, glass making procedures of this type are known as vapor phase hydrolysis/oxidation processes or simply as flame hydrolysis processes. The body formed by the deposited particles is often referred to as a "boule". The term includes any silica-containing body formed by a flame hydrolysis process.

FIG. 1 shows a porous high purity fused silica glass made with liquid feed burners. Bubbles or seeds are formed in the glass during laydown. This involves the use of a liquid feed burner in which either liquid octamethyl cyclo tetra siloxane (OMCTS) or OMCTS and titanium IV tetra isopropoxide (tipox) droplets are injected into the cavity. Results suggest that OMCTS had not fully reacted. This impacts the boule and creates bubbles (seeds). The porous glass was formed on top of a dense glass plate.

FIG. 2 shows a porous cube machined out of the glass.

FIG. 3 shows an optical micrograph of the porous surface revealing spherical pores that are between 100 and 200 $\mu$m. The porosity on this structure is low, only 12%, but higher porosity structures can be made.

Figure 4:
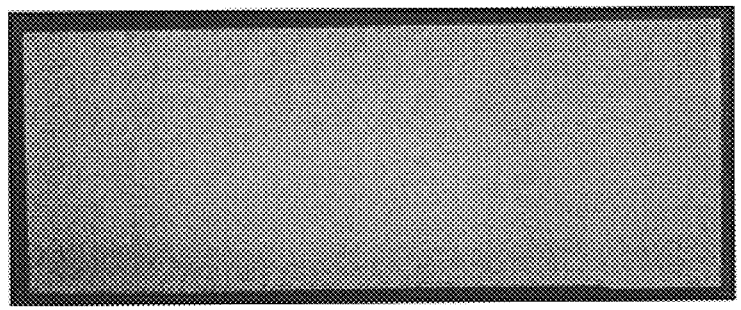
FIG. 4 shows porous glass made with vapor fed burners.

FIG. 4 shows porous glass made with conventional vapor fed burners. In this approach, a short distance between burner and boule is maintained which results in porous glass formation. The short distance typically is less than 6 inches. Complete reaction of the OMCTS is inhibited by the short reaction zone. Unreacted OMCTS hitting the boule is thought to be the mechanism of creating pores. FIG. 4 is an example of glass machined from a boule that was fabricated using this method. This glass is 25% porous with pores ranging in size between 150 $\mu$m and 600 $\mu$m. The layered structure reflects the ability of the process to create different layers during fabrication.

In a third method, porous glasses are created by having high flow rates of the OMCTS. Rates exceeding 9 g/min were noted to produce seedy glass in the single burner furnace.

In another attempt, fuel rich conditions were found to produce porous glass. These conditions are expected to delay complete OMCTS combustion by reducing the oxygen available for the reaction.

In yet another attempt, a high nitrogen inner shield was noted to produce porosity in glass. The nitrogen shield acts as a diffusion barrier and is expected to delay OMCTS reaction.

In an additional attempt, operating the nitrogen carrier gas for the OMCTS at low rates was noted to produce porosity in glass. In this case, OMCTS precursor may actually be entering the cavity as a liquid sample or a partially decomposed organic precursor.

Two methods can be used to create a dense glass backing layer onto the porous support. This dense backing layer could be used to either adhere the porous support to the mirror or can be polished into a mirror directly. The first method involves depositing porous glass on top of a dense sheet. Glass shown in FIG. 1 was made this way. The second method involves altering the conditions during lay down so that either porous glass or dense glass can be made at will.

The light weight porous glass body of this invention generally has a porosity ranging from 10 to 80 percent. Preferably, the porosity ranges from 10 to 50 percent and more preferably from 10 to 25 percent. The glass body generally has spherical pores ranging from 1 $\mu$m to 600 $\mu$m. Preferably, the pores range from 100 $\mu$m to 400 $\mu$m and more preferably from 100 $\mu$m to 300 $\mu$m. Preferably, the glass body of this invention has a closed pore structure rather than an open pore structure.

EXAMPLE I

The run conditions for the glass of FIGS. 1 to 3 were as follows. This glass was made using a single liquid feed burner. The OMCTS flow was between 5.5 and 7.5 g/min. Oxygen was used as an atomizing gas at 25 slpm. The premixed gas contained methane at 27 slpm and oxygen at 18.9 slpm. The outer shield oxygen was run at 21 slpm with inner shield nitrogen at 6.3 slpm. The distance at the start of the run from furnace crown to the sand was 9 inches and the crown temperature was maintained at about 1670° C. FIG. 3 shows an optical micrograph of the porous surface revealing spherical pores that were between 100 and 200 $\mu$m. The porosity on the structure was 12%.

EXAMPLE II

The run conditions for the glass of FIG. 4 utilized a standard burner with standard flow conditions. These include inner shield oxygen at 9.1 slpm, outer shield oxygen at 15 slpm, premixed oxygen and methane (oxygen at 20 slpm and methane at 19.8 slpm), a 2.8 slpm nitrogen gas flow as a carrier gas for the vaporized OMCTS and OMCTS flow rate of 7.5 g/min. The cup diameter was 4 inches at the bottom and 5 inches at the top while the distance from the top of the crown to the glass was 1 13/16 inch at the end of the run. FIG. 4 shows the results of this porous glass body. This glass was 25% porous with pores ranging in size between 150 $\mu$m and 600 $\mu$m.

In addition to these embodiments, persons skilled in the art can see that numerous modifications and changes may be made to the above invention without departing from the intended spirit and scope thereof.

We claim:

1. A light weight, porous glass body made by the process of claim 1, the light weight, porous body of fused silica having a porosity ranging from 10 to 80 percent and having a spherical pores ranging from 1 $\mu$m to 600 $\mu$m.

2. A light weight, porous glass body of fused silica having a porosity ranging from 10 to 80 percent and having spherical pores ranging from 1 $\mu$m to 600 $\mu$m.

3. A porous glass body according to claim 2 having a porosity ranging from 10 to 50 percent.

4. A porous glass body according to claim 2 having a porosity ranging from 10 to 25 percent.

5. A porous glass body according to claim 2 having spherical pores ranging from 100 $\mu$m to 400 $\mu$m.

6. A porous glass body according to claim 2 having spherical pores ranging from 100 $\mu$m to 300 $\mu$m.

7. A porous glass body according to claim 2 having a closed pore structure.

8. A porous glass body according to claim 2 wherein the porous body is high purity fused silica.

9. A porous glass body according to claim 2 wherein the porous body is ultra-low expansion glass.

10. A composite comprising a mirror of a dense, fused silica boule and a support of a light weight porous glass body of fused silica having a porosity ranging from 10 to 80 percent.

11. A composite according to claim 10 wherein the dense boule is high purity fused silica and the porous glass body is high purity fused silica.

12. A composite according to claim 10 wherein said fused silica is an ultra-low expansion glass.

13. A composite according to claim 10 wherein said fused silica is a titania doped fused silica.

* * * * *